US009638909B2

(12) United States Patent
Wilson et al.

(10) Patent No.: US 9,638,909 B2
(45) Date of Patent: *May 2, 2017

(54) FOCUSING APPARATUS AND METHOD

(71) Applicant: ISIS INNOVATION LIMITED, Oxford (GB)

(72) Inventors: Tony Wilson, Oxford (GB); Rimvydas Juskaitis, Oxford (GB); Martin James Booth, Oxford (GB); Edward Botcherby, Oxford (GB)

(73) Assignee: ISIS INNOVATION LIMITED, Oxford (GB)

( * ) Notice: Subject to any disclaimer, the term of this patent is extended or adjusted under 35 U.S.C. 154(b) by 929 days.

This patent is subject to a terminal disclaimer.

(21) Appl. No.: 13/846,393

(22) Filed: Mar. 18, 2013

(65) Prior Publication Data

US 2013/0215502 A1 Aug. 22, 2013

Related U.S. Application Data

(60) Continuation of application No. 13/296,975, filed on Nov. 15, 2011, now Pat. No. 8,498,048, which is a
(Continued)

(30) Foreign Application Priority Data

Dec. 22, 2006 (GB) .................................... 0625775.2

(51) Int. Cl.
*G02B 21/06* (2006.01)
*G02B 21/00* (2006.01)
(Continued)

(52) U.S. Cl.
CPC .......... *G02B 21/04* (2013.01); *G02B 21/006* (2013.01); *G02B 21/241* (2013.01);
(Continued)

(58) Field of Classification Search
CPC .. G02B 21/00; G02B 21/0016; G02B 21/006; G02B 21/02; G02B 21/04; G02B 21/241; G02B 21/242; G02B 21/24; G02B 21/245
See application file for complete search history.

(56) References Cited

U.S. PATENT DOCUMENTS 4,128,304 A 12/1978 Sussman
4,515,445 A 5/1985 Mueller et al.
(Continued)

FOREIGN PATENT DOCUMENTS

EP 0 176 358 A2 4/1986
JP 1977-026844 2/1977
(Continued)

OTHER PUBLICATIONS

International Search Report issued for International Application No. PCT/GB2007/004916, dated Jun. 2, 2008.
(Continued)

*Primary Examiner* — Thong Nguyen
(74) *Attorney, Agent, or Firm* — Knobbe, Martens, Olson & Bear, LLP

(57) ABSTRACT

A focusing apparatus for use with an optical system having a high NA objective lens includes an image forming and capturing mechanism for forming an image in an intermediate image zone and for capturing an image by receiving and refocusing light from a selected focal plane within the intermediate image zone, and a focus adjusting mechanism for adjusting the position of the selected focal plane within the intermediate image zone. The image forming and capturing mechanism includes at least one high NA lens. In use, spherical aberration introduced by the high NA objective lens is reduced.

21 Claims, 6 Drawing Sheets

Related U.S. Application Data division of application No. 12/519,517, filed as application No. PCT/GB2007/004916 on Dec. 20, 2007, now Pat. No. 8,144,395.

(51) Int. Cl.
  *G02B 21/04* (2006.01)
  *G02B 21/24* (2006.01)
  *G02B 21/36* (2006.01)
  *G02B 27/28* (2006.01)

(52) U.S. Cl.
  CPC ............ *G02B 21/245* (2013.01); *G02B 21/24* (2013.01); *G02B 21/361* (2013.01); *G02B 27/283* (2013.01)

(56) References Cited

U.S. PATENT DOCUMENTS

| | | | |
|---|---|---|---|
| 5,073,018 | A | 12/1991 | Kino et al. |
| 5,161,052 | A | 11/1992 | Hill |
| 5,496,993 | A | 3/1996 | Kasuga |
| 5,537,247 | A | 7/1996 | Xiao |
| 5,754,291 | A | 5/1998 | Kain |
| 5,801,881 | A | 9/1998 | Lanni et al. |
| 5,847,400 | A | 12/1998 | Kain et al. |
| 6,043,932 | A | 3/2000 | Kusunose |
| 6,188,514 | B1 | 2/2001 | Saito et al. |
| 6,195,202 | B1 | 2/2001 | Kusunose |
| 6,337,472 | B1 | 1/2002 | Garner et al. |
| 6,580,518 | B2 | 6/2003 | Eda et al. |
| 6,721,094 | B1 | 4/2004 | Sinclair et al. |
| 6,917,468 | B2 | 7/2005 | Thomas |
| 6,985,232 | B2 | 1/2006 | Sezginer |
| 8,144,395 | B2 * | 3/2012 | Wilson ................ G02B 21/006 359/368 |
| 8,498,048 | B2 * | 7/2013 | Wilson ................ G02B 21/006 359/368 |
| 2003/0076583 | A1 | 4/2003 | Shafer et al. |
| 2004/0085544 | A1 * | 5/2004 | De Groot ........... G01B 11/0675 356/497 |
| 2004/0165259 | A1 | 8/2004 | Mueller et al. |
| 2004/0254474 | A1 | 12/2004 | Seibel et al. |

FOREIGN PATENT DOCUMENTS

| | | |
|---|---|---|
| JP | 1991-182711 | 8/1991 |
| JP | 1993-134186 | 5/1993 |
| JP | 1995-333511 | 12/1995 |
| JP | 08-329488 | 12/1996 |
| JP | 1996-329488 | 12/1996 |
| JP | H08-329488 | 12/1996 |
| JP | 1999-305133 | 11/1999 |
| JP | 2001-500986 | 1/2001 |
| JP | 2001-517806 | 10/2001 |
| JP | 2001-324679 | 11/2001 |
| JP | 2003-098438 | 4/2003 |
| JP | 2004-102225 | 4/2004 |
| JP | 2006-139181 | 6/2006 |
| JP | 2006-154258 | 6/2006 |
| WO | WO 99/47963 A | 9/1999 |
| WO | WO 01/84209 A2 | 11/2001 |
| WO | WO 02/01934 A2 | 1/2002 |
| WO | WO 03/067632 A3 | 8/2003 |
| WO | WO 2005/094304 A3 | 10/2005 |
| WO | WO 2006/037222 A | 4/2006 |

OTHER PUBLICATIONS

Search Report for Great Britain issued for Great Britain Patent Application No. GB0625775.2, dated Apr. 19, 2007.

Focal slippage correction appts used in optical system—changes fluctuation ratio of displacement amount of reflecting member and amount of slippage of reference plane by controlling focal length of accommodation lens. DIALOG(R)File 351: Derwent WPI, Acc No. 1997-092179/199709. XRPX Acc No. N1997-076081. London: Thomson Reuters, 2009. 4 pages.

International Search Report for International Application No. PCT/GB2004/000022 mailed May 24, 2004 in 3 pages.

\* cited by examiner

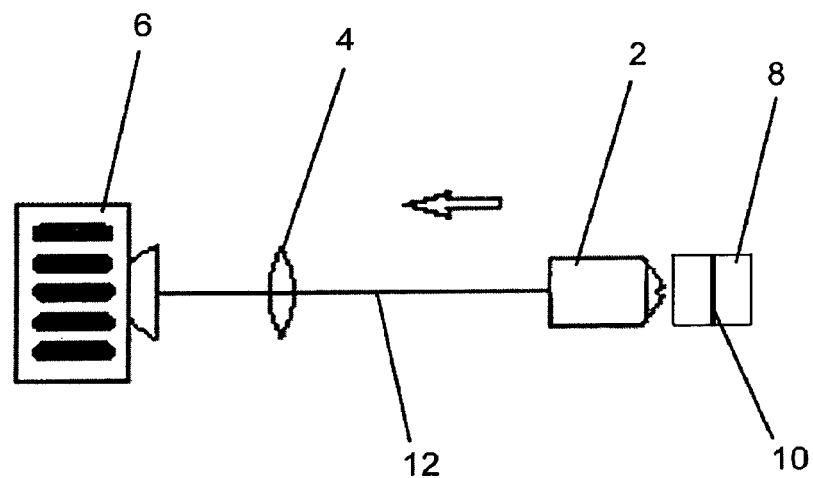
Fig. 1 - Prior Art
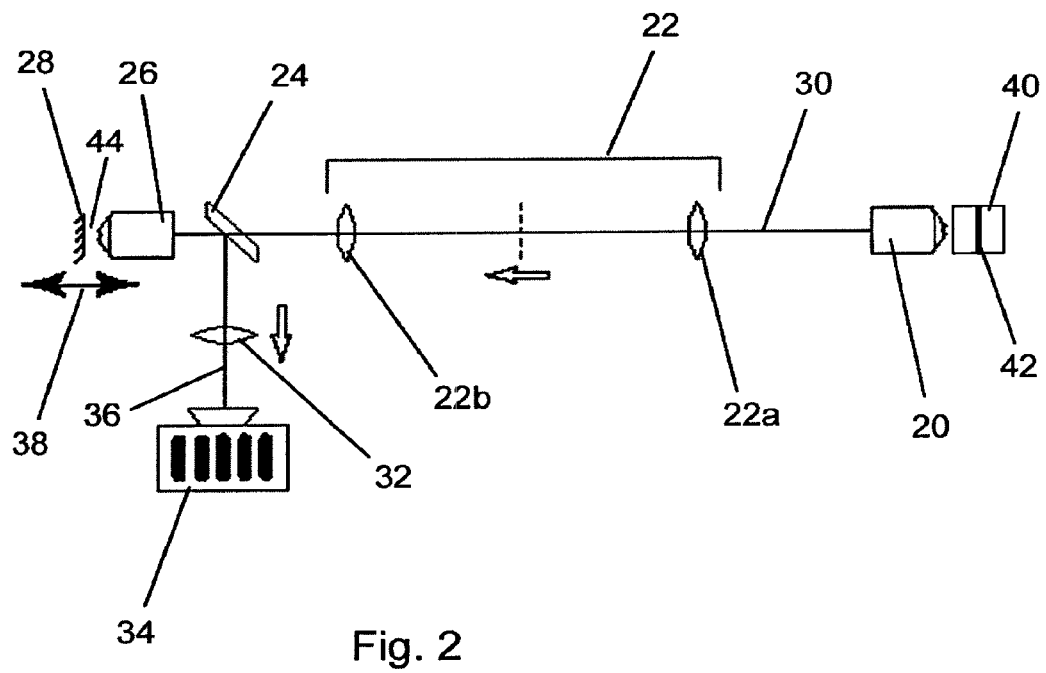
Fig. 2

FOCUSING APPARATUS AND METHOD

CROSS-REFERENCE TO RELATED APPLICATIONS

This application is a continuation of U.S. patent application Ser. No. 13/296,975, filed Nov. 15, 2011, which is a division of U.S. patent application Ser. No. 12/519,517, filed Aug. 17, 2009, now U.S. Pat. No. 8,144,395, which is a U.S. National Phase filing under 35 U.S.C. §371 of PCT/GB2007/004916, filed Dec. 20, 2007, which claims priority to Great Britain Patent Application No. 0625775.2, filed Dec. 22, 2006. The disclosures of all these prior applications are incorporated herein by reference in their entireties for all purposes.

BACKGROUND OF THE INVENTION

Field of the Invention

The present invention relates to a focusing apparatus and method and in particular, but not exclusively, to a focusing apparatus and method for use in microscopic applications. The invention may also have various non-microscopic applications.

The term "microscopic" as used herein refers to optical applications having a resolution in the range of approximately $10^{-4}$ to $10^{-7}$ meter. Such applications are generally characterized by the use of high numerical aperture (NA) objective optics, typically with a NA in the range 0.5 to 0.95 in air, or 0.7 to 1.4 in immersion oil.

The invention may be used either in applications where light is collected from an object in order to form an image or detect certain properties of the object (for example wide field or scanning microscopy, fluorescence microscopy and so on), or in applications where light is focused onto an object in order to illuminate or affect the object in some way (for example micro-fabrication or laser surgery). It should be understood that any references herein to focusing and image formation apply equally to both types of application. The invention may also be used in applications where light is focused onto an object and an image of the object is then detected.

Description of the Related Art

In conventional microscopy, light from a specimen is collected by an objective lens and focused either by an ocular for viewing by eye or by an imaging lens onto a detector, for example a charge-coupled device (CCD). A typical arrangement is shown in FIG. 1. This includes an objective lens 2, an imaging lens 4 and a CCD detector 6. Light from a specimen 8 is collected by the objective lens 2 and focused by the imaging lens 4 onto the CCD detector 6. The image recorded by the CCD will represent a thin section 10 of the specimen. Light from all other parts of the specimen will be blurred out.

In a conventional arrangement, the image represents a two-dimensional plane (the X-Y plane) that is perpendicular to the optical axis 12 (the Z-axis) of the objective 2. Sometimes, however, it may be desirable to obtain a three-dimensional image or an image from a plane that is not perpendicular to the optical axis 12 of the objective 2. In either of these cases it is necessary to adjust the focal plane of the objective, so that it collects light from different regions of the specimen. A number of images obtained from different focal planes can then be combined to obtain either a 3D image or a 2D image in a non-perpendicular plane (for example the X-Z plane).

SUMMARY OF THE INVENTION

There are two ways in which the microscope can be adjusted in order to obtain images from different planes in the specimen. The first method simply involves adjusting the distance between the objective and the specimen, by moving either the objective or the specimen in the direction of the optical axis. However, there are two major drawbacks to this approach:

(i) The speed at which mechanical adjustments can be carried out is limited by the mass of the object being moved (the objective or the specimen), which typically leads to slow response times.

(ii) Mechanical movements can sometimes disturb the specimen, thereby altering the properties that are of interest to the user.

The second method involves moving the detector relative to the objective, so as to obtain images from different planes of the specimen. However, this method is not employed commercially as it has the following drawbacks:

(i) Owing to the high magnification of most such systems, a large translation of the detector is required for even a small shift of the imaging plane in the specimen;

(ii) The discrepancy between the large numerical aperture (NA) of the objective lens and the small NA of the imaging optics that focus the image on the detector introduces a large amount of spherical aberration when the detector is not located at its optimum designed position relative to the objective. As a result, the image quality at the shifted focal plane is seriously reduced, the loss of quality becoming progressively worse as the detector displacement increases. There is therefore a large reduction in the signal to noise ratio when the detector is displaced from its optimum position. This causes real problems in most applications and especially in non-linear microscopy.

(iii) In any sectioning technique such as confocal microscopy, Nipkow disc microscopy or structured illumination microscopy, the presence of spherical aberration leads to an apparent loss of image sectioning. This is very detrimental to such imaging modes as they all rely heavily on consistent sectioning to be of practical value.

The ability to refocus a microscope so as to interrogate different focal planes is of great importance. Similarly, there is a need in certain manufacturing and other systems for the ability to refocus an illumination system quickly and accurately. Current technology allows a line scan in a single focal plane to be obtained quickly, for example at a frequency of about 5 kHz. However, mechanical limitations restrict axial scans to a much lower frequency, typically about 15 Hz. There is a need therefore for a system that allows axial scanning at a much higher frequency, without moving the specimen or encountering the problem of spherical aberration.

It is an object of the present invention to provide a focusing apparatus and method that mitigates at least some of the problems described above.

According to one aspect of the present invention there is provided a focusing apparatus for use with an optical system having a high NA objective lens, the apparatus including an image forming and capturing means for forming an image in an intermediate image zone, and for capturing an image by receiving and refocusing light from a selected focal plane within said intermediate image zone, and a focus adjusting means for adjusting the position of the selected focal plane within the intermediate image zone, wherein said image forming and capturing means includes at least one high NA lens whereby, in use, spherical aberration introduced by the high NA objective lens is reduced.

The invention makes it possible to refocus the optical system rapidly at different distances from the objective lens without introducing spherical aberration. Therefore, in the case of a microscopic imaging system, an image can be obtained from different planes within the specimen, so allowing axial scanning without moving either the specimen or the objective lens. In the case of an illuminating system, an image (that is, a light pattern) can be focused onto an object at different distances from the objective, again without introducing spherical aberration.

In one preferred embodiment, the image forming and capturing means includes a first high NA lens for forming an image in the intermediate image zone and a second high NA lens for receiving and refocusing light from the intermediate image zone, and the focus adjusting means includes means for adjusting the axial position of the second high NA lens relative to the first high NA lens. In this embodiment the components of the system can be set out in a co-axial arrangement, which provides for compact packaging. There is also no significant loss of light as it passes through the apparatus, apart from normal transmission losses.

Advantageously, the first and second high NA lenses are opposed objective lenses. Preferably, the first and second high NA lenses are identical.

In another preferred embodiment, the image forming and capturing means includes a high NA lens and a reflective element for reflecting the image formed by the high NA lens back into the same high NA lens so as to capture an image from a selected focal plane within said intermediate image zone, and wherein the focus adjusting means includes means for adjusting the axial position of the reflective element. This form of the system allows for very rapid refocusing, since only the reflective element has to be moved. As the reflective element may be a very small and light mirror, rapid adjustment is possible, for example using a piezo transducer.

In this second form of the system, the focusing apparatus preferably includes a beam splitter for dividing the reflected light from the light entering the focusing apparatus. Advantageously, the apparatus includes a polarizing beam splitter and a polarization adjuster located between the polarizing beam splitter and the intermediate image zone for adjusting the polarization of the reflected light. The polarization adjuster may be a quarter wave plate that is positioned between the beam splitter and the mirror.

Advantageously, the polarizing beam splitter is constructed and arranged to transmit incident light having a first polarization in the direction of a first axis and to reflect light having a second polarization in the direction of a second axis, the apparatus including a first image forming and capturing means including a first high NA lens and a first reflective element for forming and capturing an image in a first intermediate image zone on said first axis, and a second image forming and capturing means including a second high NA lens and a second reflective element for forming and capturing an image in a second intermediate image zone on said second axis, and means for recombining said first and second captured images. This arrangement provides the advantage that all the light passing through the beam splitter is captured, resulting in a brighter image.

Alternatively, the apparatus may include a discriminator for dividing the reflected light from the light entering the focusing apparatus. The discriminator may for example be a Glan-Thompson prism, which divides the reflected light from the light entering the focusing apparatus by shifting it at an angle away from the axis of the input beam.

Advantageously, the at least one high NA lens of the image forming and capturing means has a numerical aperture in air of at least 0.5, preferably at least 0.7, more preferably at least 0.9. For example, the high NA lens may have a numerical aperture in air of about 0.95.

According to another aspect of the invention there is provided an optical system including a high NA objective lens and a focusing apparatus according to any one of the preceding statements of invention for adjusting the focus of the high NA objective lens.

Advantageously, the at least one high NA lens of the focusing apparatus (the "focusing lens") is optically matched to the high NA objective lens. By "optically matched", we mean that a ray of light entering or leaving the objective lens in the object space at an angle γ relative to the optical axis of the objective lens will be mapped by the system to a ray that enters or leaves the focusing lens in the intermediate image space at the same angle γ relative to the optical axis of the focusing lens. This arrangement ensures that any spherical aberration introduced by the objective lens is cancelled by the focusing lens. In the simplest case, the objective lens and the focusing lens are identical. However, this is not essential: different lens may be used providing that they are optically matched. Thus, an oil immersion objective lens may for example be optically matched to a dry, high NA focusing lens.

The angular aperture of the at least one high NA lens of the focusing apparatus (the "focusing lens") is preferably at least as great as the angular aperture of the high NA objective lens. This ensures that the resolution of the system is not adversely affected by the focusing lens. For example, an oil immersion objective lens with a numerical aperture of 1.4 and an angular aperture of 67° may be used in combination with a dry, high NA focusing lens with a numerical aperture of 0.95 and an angular aperture of 71.8°.

The optical system may comprise a light detection system including a detector and means for focusing the captured image onto the detector. Alternatively, the optical system may comprise an illumination system that includes a light source for illuminating an object through the high NA objective lens. In another alternative, the optical system includes both an illumination system and a light detection system, as for example in a scanning microscope.

In another alternative form, the optical system comprises a microscope system having a large NA microscope objective lens.

According to another aspect of the invention there is provided a microscope objective lens assembly that includes a high NA objective lens and a focusing apparatus comprising a first high NA lens for forming an image in an intermediate image zone, a second high NA lens for receiving and refocusing light from the intermediate image zone, and focus adjusting means for adjusting the axial position of the second high NA lens relative to the first high NA lens. This objective lens assembly may be fitted to an existing microscope, allowing the microscope to be refocused without adjusting the position of either the specimen or the microscope objective. Advantageously, the high NA objective lens, the first high NA lens and the second high NA lens are mounted coaxially within a housing.

According to another aspect of the invention there is provided a method of focusing an optical system having a high NA objective lens, the method including forming an image in an intermediate image zone using at least one high NA lens, capturing an image by receiving and refocusing light from a selected focal plane within said intermediate image zone, and adjusting the position of the selected focal plane within the intermediate image zone, whereby spherical aberration introduced by the high NA objective lens is reduced.

According to another aspect of the invention there is provided an imaging method including gathering light from an object using an optical system having a high NA objective lens, adjusting the focus of the system by a method according to the previous statement of invention, and focusing the light onto a detector to obtain an image.

According to yet another aspect of the invention there is provided an illumination method that includes generating light from a light source, adjusting the focus of the light by a method according to the preceding statement of invention, and directing the light onto an object using an optical system having a high NA objective lens.

Certain embodiments of the invention will now be described by way of example with reference to the accompanying drawings, in which:

BRIEF DESCRIPTION OF THE DRAWINGS

FIG. 1 is a diagram of a conventional prior art microscope system;

FIG. 2 is a diagram of a microscope system according to a first embodiment of the invention;

DETAILED DESCRIPTION OF PREFERRED EMBODIMENTS

Figure 3:
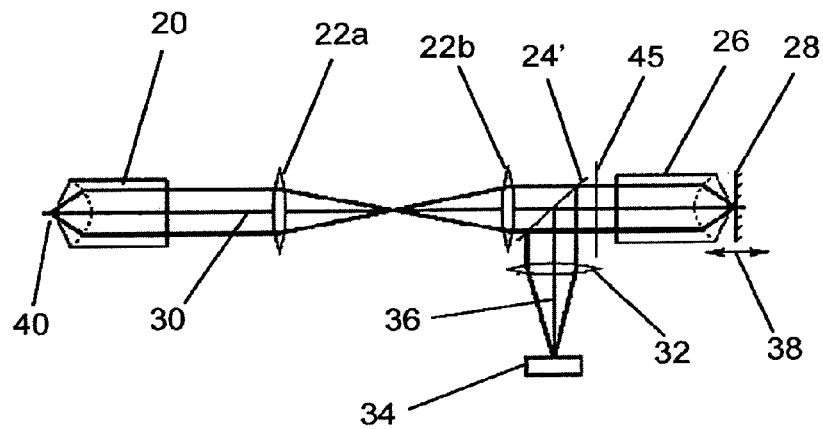
FIG. 3 is a diagram of a microscope system according to a second embodiment of the invention.

In the first embodiment of the invention shown in FIG. 2, the microscope system includes an objective lens 20, a mapping lens system 22, beam splitter 24, a reference lens 26 and a reference mirror 28, all spaced along a first optical axis 30. The objective lens 20 and the reference lens 26 are identical high NA lenses. An imaging lens 32 (or "tube" lens) and a CCD detector 34 are spaced along a second optical axis 36 that intersects the first optical axis 30 at right angles where it passes through the beam splitter 24.

The mapping lens system 22 is a 4f system comprising two lenses 22a,22b, each of which has a focal length f and is spaced from the other one of the two lenses by a distance 2f and from the pupil plane of the adjacent one of the objective lens 20 and the reference lens 26 by a distance f. The mapping lens system 22 maps the wavefront appearing at the pupil plane of the objective lens 20 onto the pupil plane of the reference lens 26.

The reference mirror 28 is mounted on a piezo transducer (not shown), which allows its position relative to the reference lens 26 to be adjusted rapidly in the direction of the first optical axis 30, as indicated by arrow 38.

Light from a specimen 42 in an object space 40 is collected by the objective lens 20 and mapped by the mapping lens system 22 onto the pupil plane of the reference lens 26, which focuses the light to form an image of the specimen 42 in an intermediate image space 44 in front of the reference lens 26 and adjacent the reference mirror 28. Because the objective lens and the reference lens 26 are matched and designed to the same mathematical condition (known as the "sine condition"), the image of the specimen 42 is reconstructed in the intermediate image space 44 without any spherical aberration. The reference mirror 28 reflects this reconstructed image back into the reference lens 26. If the reference mirror is located in the normal focal plane of the reference lens 26, the wavefront reconstructed at the pupil plane of the reference lens 26 will be identical to that entering the reference lens from the mapping lens system 22. However, if the reference mirror 28 is displaced axially, it will reflect light from a different plane within the intermediate image zone and the reconstructed wavefront will then contain information representing a different plane in the object space. The CCD detector 34 observes only the information in the focal plane of the reference lens 26. This makes it possible to select the plane of the reconstructed image that is refocused by the reference lens.

The reflected light emerging from the reference lens 26 is reflected by the beam splitter 24 along the second optical axis 36 and is focused by the imaging lens 32 onto the CCD detector 34. The CCD detector observes only the information in the focal plane of the reference lens 26. Thus, by shifting the reference mirror 28 it is possible to select different planes of the image for observation. As the reference lens 26 is matched to the high NA objective lens 20, these different planes are imaged without introducing spherical aberration.

As the mirror 28 can be very small and light, and there is no contact between the mirror and the reference lens, its position can be adjusted very quickly using the piezo transducer, allowing for axial scans at a high frequency, for example typically 100-1000 Hz, which is many times faster than the frequency of about 15 Hz available with existing systems.

In the example shown in FIG. 2 the objective lens 20 and the reference lens 26 are identical. It is also possible to use two different high NA lenses, providing that the mapping lens system 22 is modified to provide the correct magnification. For example, it is possible to use a 0.95 NA dry lens as the reference lens together with any other lens as the objective lens without affecting the resolution set by the objective lens, since the 0.95 NA dry lens has the largest angular aperture of all commercially available lenses. It is therefore possible to use a dry lens for the reference lens and an immersion lens for the objective. In this case, the reference mirror would not need to be brought into contact with the reference lens via an immersion medium. This provides the advantage that the reference mirror and the reference lens could be placed in a sealed chamber, since the user would not need access to those components. A modified form of the system is depicted in FIG. 3. In this system, the beam splitter 24 is replaced by a polarizing beam splitter 24', and a quarter wave plate 45 is located between the beam splitter 24' and the reference lens 26. The other components of the system are the same as those of the first system described above. When used with polarized light, this system provides the advantage that there is no attenuation of the light reaching the CCD detector 34.

Figure 4:
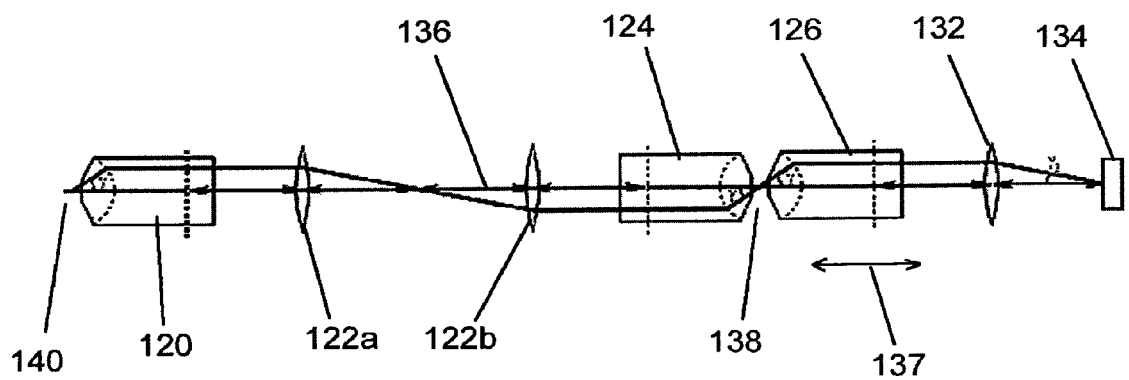
FIG. 4 is a diagram of a microscope system according to a third embodiment of the invention.

A third embodiment of the invention is shown in FIG. 4. In this embodiment, the microscope system includes an objective lens 120, a mapping lens system 122a,b, a first reference lens 124, a second reference lens 126, an imaging lens 132 and a CCD detector 134, all spaced along an optical axis 136. The mapping lens system 122a,b maps the wavefront appearing at the pupil plane of the objective lens 120 onto the pupil plane of the first reference lens 124. The objective lens 120 and the first and second reference lenses 124,126 are identical or matched high NA lenses.

The second reference lens 126 is mounted so as to be moveable relative to the first reference lens 124 along the optical axis 136, and is attached to a piezo transducer (not shown) that allows its position relative to the first reference lens 124 to be adjusted rapidly as indicated by arrow 137.

Light from a specimen is collected by the objective lens 120 and mapped by the mapping lens system 122a,b onto the pupil plane of the first reference lens 124, which focuses the light to form an image in an intermediate image space 138 between the first reference lens 124 and the second reference lens 126. As the objective lens 120 and the first reference lens 124 are matched and designed to the same mathematical condition, an image of the specimen is reconstructed without aberration in the intermediate image space 138. The second reference lens 126 collects and focuses the light emerging from this image space. The wavefront emerging from the second reference lens 126 is focused by the imaging lens 132 onto the CCD detector 134.

If the focal plane of the second reference lens 126 is located in the focal plane of the first reference lens 124, the wavefront reconstructed at the pupil plane of the second reference lens 126 will be identical to that entering the first reference lens 124 from the mapping lens system 122. However, if the second reference lens 126 is displaced axially, it will gather light from a different plane within the intermediate image zone and the reconstructed wavefront will then contain information representing a different plane in the object space. The CCD detector 134 observes only the information in the focal plane of the second reference lens 126. Thus, by shifting the second reference lens 126, it is possible to select different planes of the image for observation, without introducing spherical aberration. As with the previous system, the position of the second reference lens 126 can be adjusted very quickly, for example using a suitable transducer, allowing for axial scans at a high frequency.

The system is designed to map a ray leaving a specimen in the object space 140 at an angle γ to a conjugate ray entering an intermediate image space 138 also with an angle γ. If this is the case then the light distribution in the object space is re-imaged without aberration in the intermediate image space 138. The detector assembly 132,134 images a single plane of intermediate image space. Moving the second reference lens 126 along the axis selects different planes for imaging and the resulting images formed on the detector 134 are all free from aberration. In this embodiment it may be preferable for packaging reasons that the objective lens 120 and the first reference lens 124 are identical. However, this is not essential, providing that the objective lens 120 and the first reference lens 124 are optically matched.

The arrangement shown in FIG. 4 has the advantage that there is no significant light loss with either polarized or unpolarized light, since a beam splitter is not used. The disadvantage is that refocusing may be slower than with a mirror, owing to the greater mass of the second reference lens 126. However, it should still be considerably faster than conventional systems.

The systems described above and shown in FIGS. 2 to 4 are all intended for use in microscopic imaging systems, in which an image of a specimen is focused onto a detector. Such applications include wide field microscopy, confocal microscopy, non-linear microscopy, stereo microscopy, scanning microscopy and slit scanning microscopy, using techniques such as reflection, transmission, fluorescence, phase contrast and polarization imaging.

The invention is however also applicable to illumination systems in which light from a source is focused onto a specimen. Such applications include micro-fabrication (e.g. micro-machining through optical ablation and photo-induced polymerization), laser surgery, photoporation of cells (the selective creation of a hole in a cell wall for transfection), optical trapping, atom trapping, data storage (e.g. the writing of data in 3-dimensional multilayer optical storage media), and non-linear microscopy (e.g. multi-photon microscopy, second harmonic generation microscopy and third harmonic generation microscopy).

The layout of the illumination system may be virtually identical to any one of the imaging systems shown in FIGS. 2 to 4, except that in each case the CCD detector is replaced by a suitable light source and, if required, a suitably-scaled mask or equivalent device for creating an illumination pattern that is to be focused onto the specimen. The axial position of the illumination pattern within the specimen can be adjusted by moving the reference mirror or the second reference lens as appropriate, thereby refocusing the system. Again no movement of either the objective lens or the specimen is required and spherical aberration is avoided.

The invention is also applicable to applications that involve both illuminating a specimen and collecting light emerging from the specimen, for example scanning confocal microscopy (by reflection or fluorescence), non-linear microscopy with a detection pinhole and data storage (e.g. with confocal read-out of 3D, multilayer storage media). The invention may be used to eliminate spherical aberration both in the illuminating radiation and in the light collected from the specimen, thus allowing high quality images to be captured in axially-spaced planes.

Figure 5:
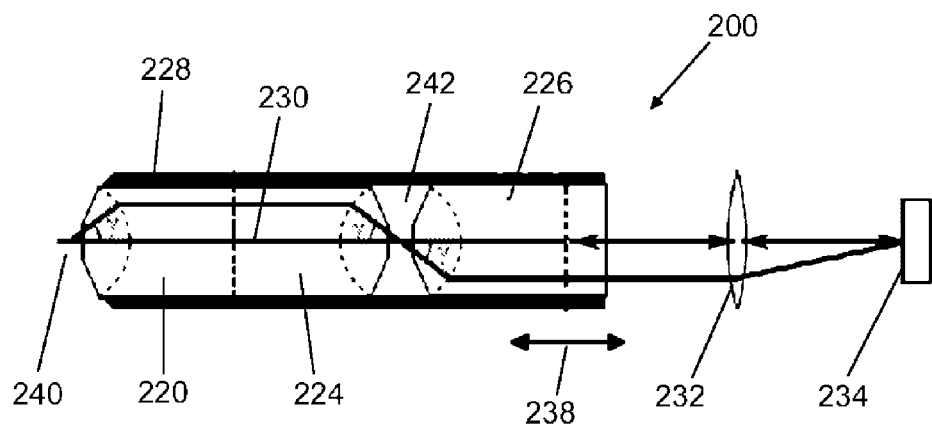
FIG. 5 is a diagram of a microscope objective lens, comprising a fourth embodiment of the invention.

A practical embodiment of the invention in the form of a microscope objective assembly 200 is shown in FIG. 5. The objective assembly 200 is designed for use on a conventional microscope, as a replacement for an existing objective assembly.

This objective assembly 200 is based on the arrangement shown in FIG. 4 and includes an objective lens 220, a first reference lens 224 and a second reference lens 226, all mounted within a housing 228 and spaced along a common optical axis 230. The microscope also includes an imaging lens (or tube lens) 232 and a CCD detector 234. The objective lens 220 and the first reference lens 224 are mounted back-to-back so that their pupil planes coincide. The wavefront appearing at the pupil plane of the objective lens 220 in thus mapped onto the pupil plane of the first reference lens 224. The objective lens 220 and the first and second reference lenses 224,226 are identical high NA lenses.

The second reference lens 226 is mounted within the housing 228 so as to be moveable along the optical axis 230 relative to the first reference lens 224, and is attached to a suitable transducer (not shown) that allows its position relative to the first reference lens 224 to be adjusted rapidly as indicated by arrow 238. Light emerging from the pupil plane of the second reference lens 226 is focused by the imaging lens 232 onto the CCD detector 234.

In use, light from a specimen in the object space 240 is collected by the objective lens 220 and focused by the first reference lens 224 in an intermediate image space 242 between the first reference lens 224 and the second reference lens 226. As the objective lens 220 and the first reference lens 224 are identical, an image of the specimen is reconstructed without aberration in the intermediate image space 242. The second reference lens 226 collects and focuses the light emerging from this image space 242. The wavefront emerging from the second reference lens 226 is focused by the imaging lens 232 onto the CCD detector 234.

If the focal plane of the second reference lens 226 is located in the focal plane of the first reference lens 224, the wavefront reconstructed at the pupil plane of the second reference lens 226 will be identical to that entering the first reference lens 224 from the objective lens 220. However, if the second reference lens 226 is displaced axially, it will gather light from a different plane within the intermediate image zone and the reconstructed wavefront will then contain information representing a different plane in the object space. The CCD detector 234 observes only the information in the focal plane of the second reference lens 226. Thus, by shifting the second reference lens 226, it is possible to select different planes of the image for observation without introducing spherical aberration. As with the previous system, the position of the second reference lens can be adjusted very quickly, allowing for axial scans at a high frequency.

Figure 6:
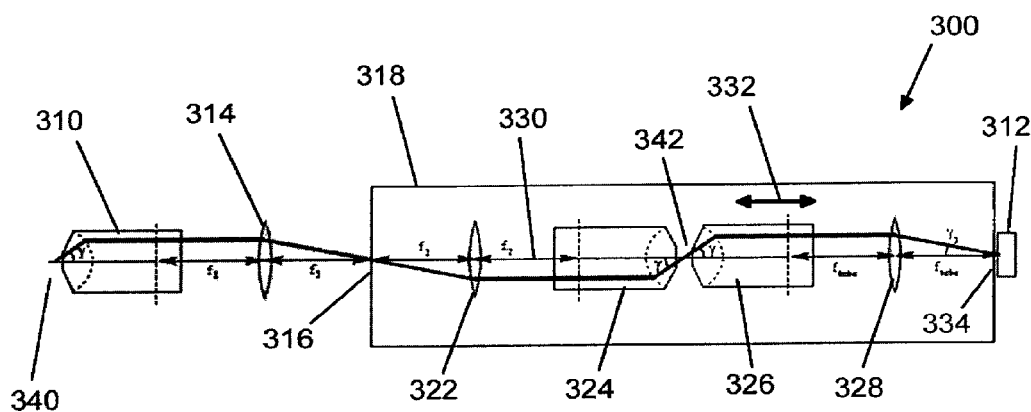
FIG. 6 is a diagram of a plug-in assembly for the camera port of a microscope, according to a fifth embodiment of the invention.

Another practical embodiment of the invention in the form of a plug-in assembly 300 for the camera port of an existing microscope is shown in FIG. 6. The assembly 300 is designed to plug in between the microscope objective lens 310 and an existing camera or CCD detector 312. Alternatively, the CCD detector 312 may be part of the plug-in assembly 300. The microscope also includes a tube lens 314 that focuses light from the pupil plane of the objective lens 310 onto an entry window 316 of the assembly 300.

The plug-in assembly 300 is again based on the arrangement shown in FIG. 4 and includes a housing 318, a mapping lens 322, a first reference lens 324, a second reference lens 326, and an imaging lens 328, all spaced along a common optical axis 330. The tube lens 314 and the mapping lens 322 together map the wavefront appearing at the pupil plane of the objective lens 310 onto the pupil plane of the first reference lens 324. The objective lens 310 and the first reference lens 324 are identical or matched high NA lenses.

The second reference lens 326 is mounted within the housing 318 so as to be moveable along the optical axis 330 relative to the first reference lens 324, and is attached to a transducer (not shown) that allows its position relative to the first reference lens 324 to be adjusted rapidly as indicated by arrow 332. Light emerging from the pupil plane of the second reference lens 326 is focused by the imaging lens 328 through an exit window 334 onto the CCD detector 312.

In use, light from a specimen in the object space 340 is collected by the objective lens 310 and mapped by the tube lens 314 and the mapping lens 322 onto the pupil plane of the first reference lens 324. This light is focused by the first reference lens 324 in an intermediate image space 342 between the first reference lens 324 and the second reference lens 326. The objective lens 310 and the first reference lens 324 are identical or matched, and an image of the specimen is thus reconstructed without aberration in the intermediate image space 342. The second reference lens 326 collects and focuses the light emerging from this image space. The wavefront emerging from the second reference lens 326 is focused by the imaging lens 328 through an exit window 334 onto the CCD detector 312.

When the focal plane of the second reference lens 326 is located in the focal plane of the first reference lens 324, the wavefront reconstructed at the pupil plane of the second reference lens 326 will be identical to that entering the first reference lens 324 from the objective lens 310. However, if the second reference lens 326 is displaced axially, it will gather light from a different plane within the intermediate image zone and the reconstructed wavefront will then contain information representing a different plane in the object space. The CCD detector 312 observes only the information in the focal plane of the second reference lens 326. Thus, by shifting the second reference lens 326, it is possible to select different planes of the image for observation without introducing spherical aberration. The position of the second reference lens can be adjusted very quickly, allowing axial scans to be performed at a high frequency.

Figure 7:
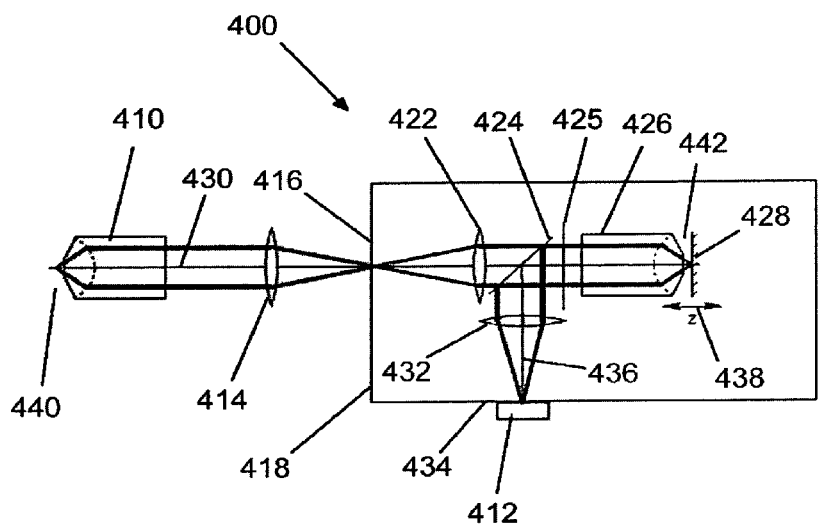
FIG. 7 is a diagram of an alternative plug-in assembly for the camera port of a microscope, according to a sixth embodiment of the invention.

An alternative plug-in assembly 400 for the camera port of an existing microscope is shown in FIG. 7. The assembly 400 is designed to plug in between the microscope objective lens 410 and the existing camera or CCD detector 412. The microscope also includes a tube lens 414 that focuses light from the pupil plane of the objective lens 410 onto an entry window 416 of the assembly 400.

The plug-in assembly 400 is based on the arrangement shown in FIG. 3 and includes a housing 418, a mapping lens 422, beam splitter 424, a quarter wave plate 425, a reference lens 426 and a reference mirror 428, all spaced along a first optical axis 430. The objective lens 410 and the reference lens 426 are identical high NA lenses. An imaging lens (or "tube" lens) 432 and the CCD detector 412 are spaced along a second optical axis 436 that intersects the first optical axis 430 at right angles where it passes through the beam splitter 424.

The tube lens 414 and the mapping lens 422 map the wavefront appearing at the pupil plane of the objective lens 410 onto the pupil plane of the reference lens 426. The objective lens 410 and the reference lens 426 are identical or matched high NA lenses.

The mirror 428 is mounted within the housing 418 so as to be moveable along the optical axis 430 relative to the reference lens 426, and is attached to a piezo transducer (not shown) that allows its position relative to the reference lens 426 to be adjusted rapidly as indicated by arrow 438. Light emerging from the pupil plane of the reference lens 426 is focused by the imaging lens 432 through an exit window 434 onto the CCD detector 412.

In use, light from a specimen in the object space 440 is collected by the objective lens 410 and focused by the reference lens 426 in an intermediate image space 442 adjacent the mirror 428. As the objective lens 410 and the reference lens 426 are identical or matched, an image of the specimen is reconstructed without aberration in the intermediate image space 442. This light is reflected by the mirror 428 back towards the reference lens 426, which collects and focuses the reflected light. The wavefront emerging from the reference lens 426 is then focused by the imaging lens 432 onto the CCD detector 412.

When the mirror 428 is located in the focal plane of the reference lens 426, the wavefront reconstructed at the pupil plane of the reference lens 426 will be identical to that entering the lens from the objective lens 410. However, if the mirror 428 is displaced axially, it will reflect light from a different plane within the intermediate image zone and the reconstructed wavefront will then contain information representing a different plane in the object space. The CCD detector 412 observes only the information in the focal plane of the reference lens 426. Thus, by shifting the mirror 428, it is possible to select different planes of the image for observation without introducing spherical aberration. The position of the mirror can be adjusted very quickly using the piezo transducer, allowing axial scans to be performed at a high frequency.

Figure 8:
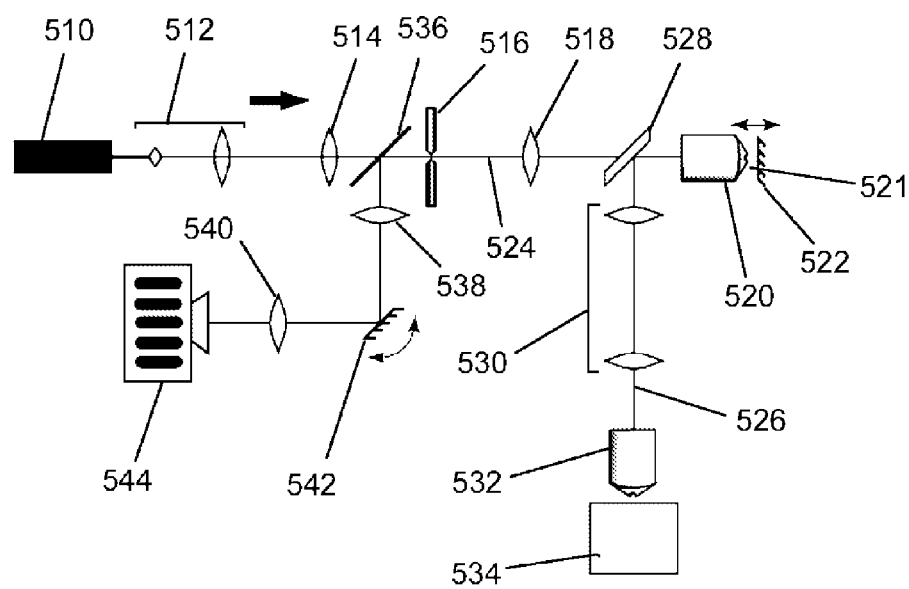
FIG. 8 is a diagram of a slit scanning confocal microscope according to a seventh embodiment of the invention.

FIG. 8 illustrates a slit scanning confocal microscope according to a seventh embodiment of the invention. The microscope includes a laser light source 510, a beam expander 512, a cylindrical lens 514 and a narrow slit 516, which together form a flat beam of light, which is focused by a lens 518 into a reference lens 520. This light is focused by the reference lens 520 into an intermediate image space 521 adjacent a reference mirror 522, which is mounted for movement along the optical axis 524 of the aforesaid components. The light is reflected back into the reference lens 520 by the mirror 522 and then reflected along a second optical axis 526 by a beam splitter 528. This light is focused through an intermediate lens system 530 into an objective lens 532, which focuses the flat light beam onto a specimen 534.

The axial position at which the light beam is focused within the specimen 534 can be adjusted by moving the reference mirror 522. The objective lens 532 and the reference lens 520 are matched to eliminate any spherical aberration from the illuminating beam.

The light reflected by the specimen is collected by the objective lens 532 and focused through the intermediate lens system 530, the beam splitter 528 and the reference lens 520 into the intermediate image space 521 adjacent the mirror 522. The light is then reflected by the mirror 522 back into the reference lens 520 and along the first optical axis 524. This light is reflected by a second beam splitter 536, a pair of lenses 538, 540 and a rotatable mirror 542 onto a CCD detector 544. Rotating the mirror 542 allows a line image to be scanned across the detector 544.

Moving the reference mirror 522 in the direction of the first optical axis 524 adjusts simultaneously both the position of the focused illuminating beam within the specimen 534, and the image plane focused onto the detector 544. The image plane can thus be scanned through the specimen in the direction of the optical axis 526 (the Z axis) of the objective lens 532. By simultaneously adjusting the axial position of the reference mirror 522 and the angular position of the rotatable mirror 542, an image representing an XZ plane of the specimen can be captured in real time, without requiring any subsequent processing.

Figure 9:
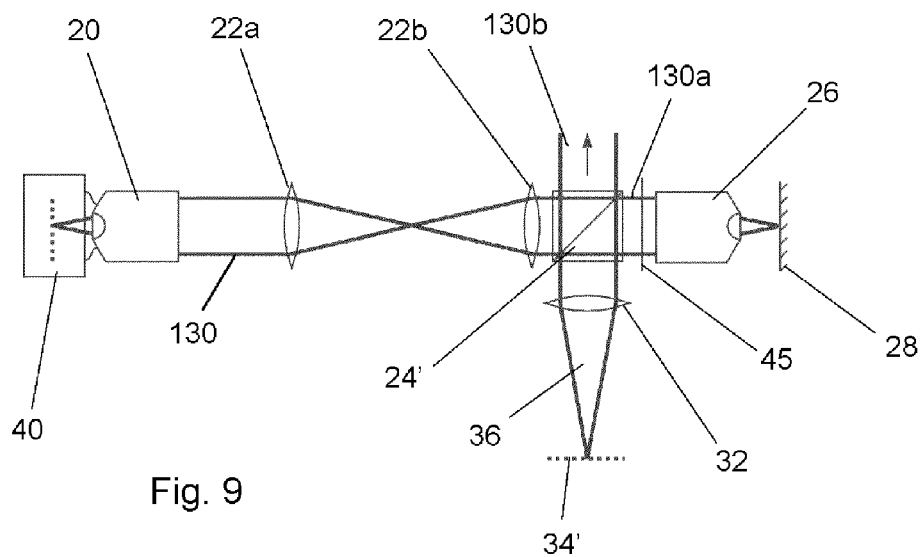
FIG. 9 is a diagram of a microscope system similar to that shown in FIG. 3.

FIG. 9 shows a microscope system similar to that shown in FIG. 3, including a polarizing beam splitter 24' and a quarter wave plate 45 located between the beam splitter 24' and the reference lens 26. The other components of the system are the same as those of the system described above.

When used with polarized light, there is no attenuation of the light reaching the image plane 34'. However, when the system is used with unpolarized light, the light 130 entering the polarizing beam splitter 24' is divided into two parts, the first part 130*a* passing through the beam splitter while the second part 130*b* is reflected from it. As this second part is not captured, the light reaching the image plane 34' is attenuated by 50%.

Figure 10:
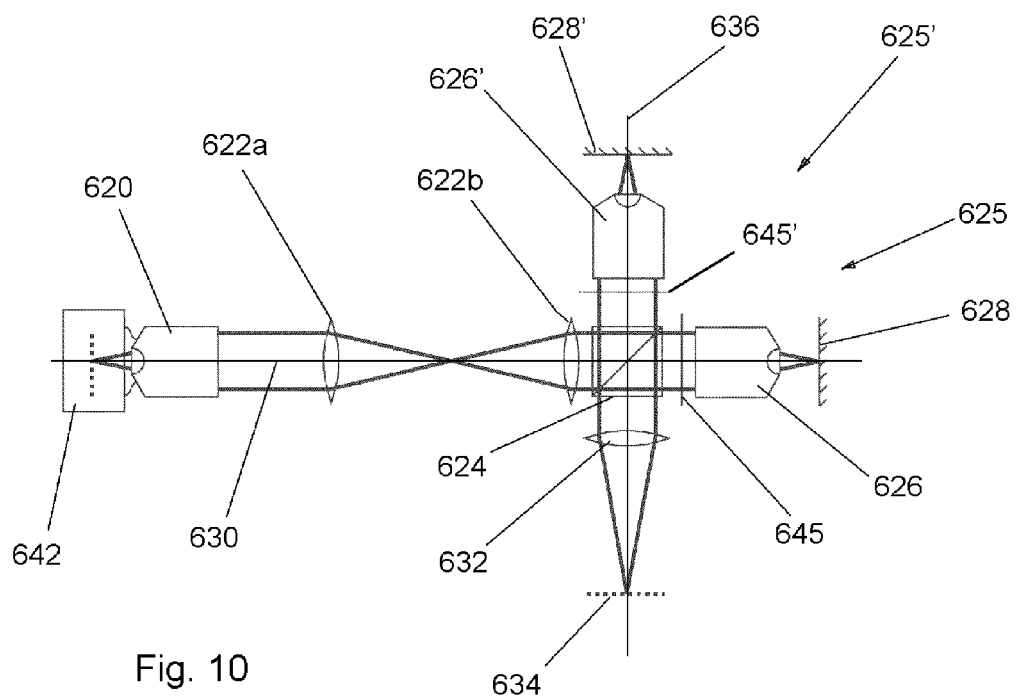
FIG. 10 is a diagram of a microscope system according to an eighth embodiment of the invention.

FIG. 10 shows a modified version of the microscope system shown in FIG. 9, in which this problem is addressed. The microscope system includes an objective lens 620*a,b*, a mapping lens system 622, a polarizing beam splitter 624 and a first image forming and capturing system 625, all located on a first optical axis 630. The first image forming and capturing system 625 is similar to that shown in FIG. 9, comprising a reference lens 626, a reference mirror 628 and a quarter wave plate 645. A second image forming and capturing system 625' is located on a second optical axis 636 that intersects the first optical axis 630 at a right angle where it passes through the beam splitter 624. The second image forming and capturing system 625' comprises a reference lens 626', a reference mirror 628' and a quarter wave plate 645'. An imaging lens 632 and a detector 634 are also located on the second optical axis 636, on the opposite side of the beam splitter 624.

Light from a specimen 642 is collected by the objective lens 620, split into two parts by the beam splitter 624 and mapped onto the pupil planes of the reference lenses 626, 626'. Each reference lens 626,626' focuses the light to form an image of the specimen in an intermediate image space adjacent the respective reference mirror 628,628', which reflects the reconstructed image back into the respective reference lens 626,626'. The reflected light is recombined by the beam splitter 624 and focused by the imaging lens 632 onto the detector 634. The two mirrors are adjusted synchronously to ensure that the reflected images are identical. Both parts of the light emerging from the beam splitter 624 are used, thereby avoiding undesirable attenuation.

Figure 11:
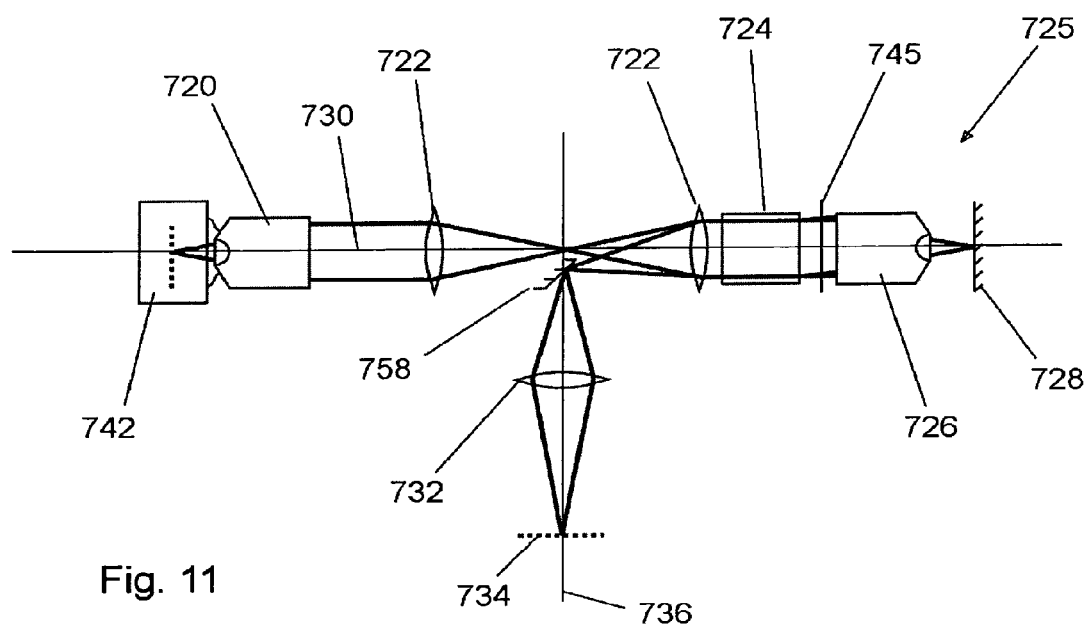
FIG. 11 is a diagram of a microscope system according to a ninth embodiment of the invention.
Figure 12:
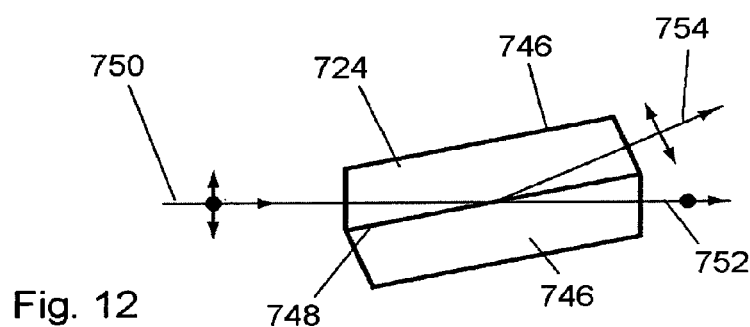
FIGS. 12 and 13 are diagrams of a discriminator forming part of the microscope system shown in FIG. 11.
Figure 13:
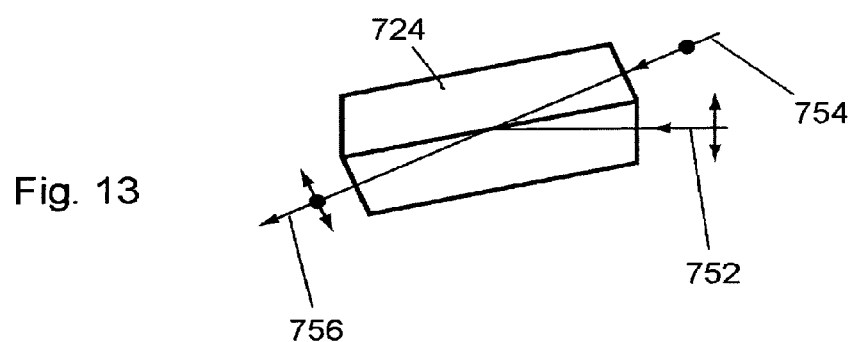

An alternative arrangement is shown in FIGS. 11-13, in which the microscope system includes an objective lens 720, a mapping lens system 722, a discriminator 724 and an image forming and capturing system 725, all located on a first optical axis 730. The image forming and capturing system 725 comprises a reference lens 726, a reference mirror 728 and a quarter-wave plate 745. An imaging lens 732 and a detector 734 are located on a perpendicular second optical axis 736.

The discriminator 724, which is shown in more detail in FIGS. 12 and 13, comprises a polarizing prism (in this case a Glan-Thompson prism) made of two birefringent calcite crystals 746 that are joined by a layer of cement 748. As shown in FIG. 12, the prism splits the unpolarized light beam 750 entering the prism into an s-polarized extraordinary ray 752 that is transmitted without significant deviation through the prism and an p-polarized ordinary ray 754 that is reflected internally from the calcite/cement interface at an angle to the extraordinary ray 752. Both rays pass through the quarter-wave plate 745 and the reference lens 726 and are then reflected by the mirror 728 back through the lens and the plate. This rotates the polarization of both rays through 90°. The rays then re-enter the discriminator as shown in FIG. 13, which recombines the rays to form a single unpolarized beam 756 that leaves the prism at a small angle relative to the original beam 750.

The recombined beam 756 is then reflected by an angled mirror 758 along the second optical axis 736, so that it passes through the imaging lens 732 into the detector 734. Because the recombined beam 756 is shifted through a small angle relative to the original beam, the mirror 758 can be displaced to one side of the first optical axis, so that it does not impede the input beam.

In this arrangement, all the light from a specimen 742 is collected and focused onto the detector 734, thus avoiding attenuation. Only a single refocusing mirror 728 is required and this can be adjusted at high speed to image different planes of the sample.

What is claimed is:

1. A focusing apparatus for use with an optical system having a high numerical aperture (NA) objective lens, the apparatus including:
   an image forming and capturing means configured to receive light from a specimen via the high NA objective lens, wherein the image forming and capturing means includes a high NA lens that focuses the light received via the high NA objective lens to form an image in an intermediate image zone, and a reflective element at an axial position within the intermediate image zone that reflects the image formed by the high NA lens back into the same high NA lens so that the high NA lens captures an image from a selected focal plane within said intermediate image zone; and
   a focus adjusting means that adjusts the axial position of the reflective element to adjust a position of the selected focal plane within the intermediate image zone, whereby spherical aberration is reduced.

2. A focusing apparatus according to claim 1, wherein the high NA lens has a numerical aperture in air in the range of 0.5 to 0.95.

3. A focusing apparatus according to claim 1, wherein the high NA lens has a numerical aperture in air in the range of 0.7 to 0.95.

4. A focusing apparatus according to claim 1, wherein the high NA lens has a numerical aperture in air in the range of 0.9 to 0.95.

5. A focusing apparatus according to claim 1, further comprising a discriminator that divides reflected light from the light entering the focusing apparatus.

6. An optical system including a high NA objective lens and a focusing apparatus for adjusting a focus of the high NA objective lens, the focusing apparatus including:
   an image forming and capturing means configured to receive light from a specimen via the high NA objective lens, wherein the image forming and capturing means includes a high NA lens that focuses the light received via the high NA objective lens to form an image in an intermediate image zone, and a reflective element at an axial position within the intermediate image zone that reflects the image formed by the high NA lens back into the same high NA lens so that the high NA lens captures an image from a selected focal plane within said intermediate image zone; and
   a focus adjusting means that adjusts the axial position of the reflective element to adjust a position of the selected focal plane within the intermediate image zone, whereby spherical aberration is reduced.

7. An optical system according to claim 6, wherein the high NA lens is optically matched to the high NA objective lens.

8. An optical system according to claim 6, wherein an angular aperture of the high NA lens is at least as great as an angular aperture of the high NA objective lens.

9. An optical system according to claim 6, said optical system comprising a light detection system including a detector and means for focusing the captured image onto the detector.

10. An optical system according to claim 6, said optical system comprising an illumination system that includes a light source for illuminating an object through the high NA objective lens.

11. An optical system according to claim 6, said optical system comprising a microscope system having a large NA microscope objective lens.

12. An optical system including a high NA objective lens and a focusing apparatus for adjusting a focus of the high NA objective lens, the focusing apparatus including:
   an image forming and capturing means for forming an image in an intermediate image zone, and for capturing an image by receiving and refocusing light from a selected focal plane within said intermediate image zone, and
   a focus adjusting means for adjusting a position of the selected focal plane within the intermediate image zone,
   wherein said image forming and capturing means includes at least one high NA lens whereby, in use, spherical aberration introduced by the high NA objective lens is reduced.

13. An optical system according to claim 12, wherein the at least one high NA lens of the focusing apparatus is optically matched to the high NA objective lens.

14. An optical system according to claim 13, wherein an angular aperture of the at least one high NA lens of the focusing apparatus is at least as great as an angular aperture of the high NA objective lens.

15. An optical system according to claim 12, said optical system comprising a light detection system including a detector and means for focusing the captured image onto the detector.

16. An optical system according to claim 12, said optical system comprising an illumination system that includes a light source for illuminating an object through the high NA objective lens.

17. An optical system according to claim 12, said optical system comprising a microscope system having a large NA microscope objective lens.

18. An optical system according to claim 12, wherein the image forming and capturing means includes the at least one high NA lens and a reflective element for reflecting the image formed by the at least one high NA lens back into the same high NA lens so as to capture an image from the selected focal plane within said intermediate image zone, and wherein the focus adjusting means includes means for adjusting an axial position of the reflective element.

19. An optical system according to claim 18, including a discriminator for dividing reflected light from light entering the focusing apparatus.

20. An optical system according to claim 12, including a polarising beam splitter, wherein the polarising beam splitter is constructed and arranged to transmit incident light having a first polarisation in the direction of a first axis and to reflect light having a second polarisation in the direction of a second axis, the apparatus including a first image forming and capturing means including a first high NA lens and a first reflective element for forming and capturing an image in a first intermediate image zone on said first axis, and a second image forming and capturing means including a second high NA lens and a second reflective element for forming and capturing an image in a second intermediate image zone on said second axis, and means for recombining said first and second captured images.

21. An optical system according claim 12, wherein the at least one high NA lens of the image forming and capturing means has a numerical aperture in air of one of 0.5, 0.7, or 0.9.

* * * * *